United States Patent [19]

Knaus

[11] 4,308,352
[45] Dec. 29, 1981

[54] PROCESS OF EXTRUDING POLYSULFONE FOAM

[75] Inventor: Dennis A. Knaus, Centerville, Mass.

[73] Assignee: Packaging Industries Group, Inc., Hyannis, Mass.

[21] Appl. No.: 257,466

[22] Filed: Apr. 24, 1981

[51] Int. Cl.³ .............................................. C08J 9/14
[52] U.S. Cl. ..................................... 521/79; 264/53; 264/54; 264/DIG. 5; 521/87; 521/88; 521/95; 521/98; 521/189; 521/910
[58] Field of Search ................ 521/79, 81, 189, 98, 521/87, 88

[56] References Cited

U.S. PATENT DOCUMENTS

| | | | |
|---|---|---|---|
| 3,227,784 | 1/1966 | Blades et al. | 521/79 |
| 3,389,446 | 6/1968 | Parrish | 521/79 |
| 3,442,829 | 5/1969 | Moore et al. | 521/189 |
| 3,542,715 | 11/1970 | White et al. | 521/79 |
| 3,787,363 | 1/1974 | Staniland et al. | 521/189 |
| 3,962,154 | 6/1976 | Egli | 521/79 |
| 4,142,029 | 2/1979 | Illy | 521/189 |
| 4,183,822 | 1/1980 | Collington et al. | 521/189 |
| 4,190,710 | 2/1980 | Fey | 521/189 |
| 4,258,138 | 3/1981 | Britton | 521/189 |

Primary Examiner—Morton Foelak
Attorney, Agent, or Firm—Kenway & Jenney

[57] ABSTRACT

A method for the preparation of polysulfone foam using methylene chloride as a blowing agent. A pressurized combination of heat-plastified foamable gel of polysulfone containing methylene chloride as a blowing agent is extruded into a zone of lower pressure through an orifice of a die. As the gel expands into a foam, it forms a product of decreased density, increased resiliency and flexibility, and improved insulation properties over conventional polysulfone foam.

13 Claims, 2 Drawing Figures

PROCESS OF EXTRUDING POLYSULFONE FOAM

BACKGROUND OF THE INVENTION

This invention relates generally to the manufacture of polysulfone foams and more particularly to a method of producing polysulfone foams having substantially uniform fine cell structure.

Foams of thermoplastic resins such as, for example, polystyrene and polyethylene, are useful industrial products because of their excellent heat-insulating, cushioning, and other properties. These foams have found acceptance over the years in such applications as thermal insulation, food containers and as raw materials for the fabrication of various shaped articles.

The preparation of thermoplastic foams by extruding a heat-plastified mixture of thermoplastic resin and a blowing agent is well known as described in U.S. Pat. Nos. 2,740,157; 3,067,147; 3,413,387; 3,413,388; 3,431,163; 3,431,164; 3,954,929; and 3,966,381, and Canadian Pat. No. 451,864, and in other literature pertaining to the art.

U.S. Pat. No. 2,450,436 contains an early disclosure of a method for the preparation of cellular thermoplastic products. Here, a solid thermoplastic resin, e.g., polystyrene, and a normally gaseous agent such as methyl chloride, methyl ether, propylene, or butylene are held in a closed vessel under pressure at a temperature below the critical temperature of the normally gaseous agent until a homogeneous mobile gel is obtained. Thereafter, an outlet is opened to permit flow of the gel from the vessel. During flow of the mobile gel from the pressurized vessel into a zone of lower pressure, the resin is swollen by vaporization and expansion of the dissolved volatile substance to form a stable cellular product consisting for the most part of individual closed thin-walled cells.

A method of forming under pressure a mixture of predetermined proportion of a normally gaseous agent and a thermoplastic resin and storing the mixture by feeding the same into a pressurized storage vessel wherein it is maintained at a desired temperature until a homogeneous mobile gel or solution is obtained prior to extrusion and expansion of the resin, as just mentioned, is described in U.S. Pat. No. 2,515,250.

U.S. Pat. No. 3,067,147 discloses a method for the preparation of a cellular mass from thermoplastic resins by incorporating in the material to be foamed a gas or volatile organic liquid with a thermoplastic resin, the latter then being heated to a temperature at which it becomes plastic, whereby vapors of gas or volatile liquid expand the softened resin to form a cellular mass.

U.S. Pat. No. 2,387,730 teaches the making of cellular polyethylene by impregnating a molten polymer with a gas which is soluble therein under pressure, then partially releasing the pressure while maintaining the temperature to expand the polymer and cooling the expanded polymer.

Although the foregoing noted patents indicate that the formation of a cellular mass is well known and that numerous practical techniques are available, bulk density remains high, which leads to inferior insulatory qualities for a given quantity of material, relatively poor cushioning effects, and limited uses of polysulfone foam as a thermoformed sheet.

Currently popular techniques of manufacturing a cellular polymeric body involve feeding a polymer in suitable granular form to an extruder through a hopper. The polymer is pressed by a screw and heated in a barrel of the extruder until it is melted or heat-plastified. The molten polymer is forwarded around a sealing blister which forms a plastic seal against counter-current flow of gas or vapors through the barrel of the extruder and out the hopper. A blowing agent is fed under pressure via an inlet beyond the sealing blister to form an admixture with the molten polymer in the extruder wherein it is mechanically agitated, thoroughly mixed and brought to a uniform temperature throughout its mass just prior to its extrusion as a gel through an orifice into a zone of lower pressure, e.g., the atmosphere, wherein the gel expands to form a cellular body.

In many end-use applications, it has been recognized that polysulfone forms having low densities and improved flexible properties would be valuable. Also, of course, if a foam sheet could be thermoformed for food containers, speakers and other devices of similar requirements, it would be of highly commercial importance. However, to obtain such basic foam structure, it was believed that it would not be practical to increase sufficiently the percentage of blowing agent in the resin to lower its density.

The presently practiced methods for making cellular bodies from normally solid polysulfone polymers have not been entirely satisfactory because partially releasing the pressure while maintaining the temperature sufficient to keep the polymer in a molten condition to expand the polymer is difficult to accomplish. The process is also difficult to control where uniform small cells are desired in the low density end product.

The normal extrusion temperature of polysulfone is in the 285° to 371° C. range. Such high temperature restricts the types of fluorocarbon blowing agents that can be used because they quickly degrade at these temperatures. In general, it has been found that chlorodifluoromethane is the most suitable of the fluorocarbons because of its higher decomposition temperature. Chlorodifluormethane is not very soluble in polysulfone and foam densities cannot be obtained much lower than 15 lb/cu ft.

It is a primary object of the invention to provide an improved process and volatile agents for making cellular masses from thermoplastic normally solid polysulfone polymers.

Another object is to provide a process for making cellular masses from thermoplastic normally solid polysulfone polymers in a continuous manner.

A further object is to provide a process and volatile agents for making cellular masses composed of uniform fine cells from thermoplastic normally solid polysulfone.

A specific object is to provide a process and volatile foaming agents for making cellular polysulfone composed of uniform fine cells.

SUMMARY OF THE INVENTION

By following the concepts of the present invention, there can be produced polysulfone foams having significantly lower densities than those obtained by earlier practiced methods, e.g., using chemical or fluorocarbon blowing agents. In addition, the polysulfone foams produced in accordance with this invention generally have improved cushioning qualities and improved insulating properties. The new foams produced can also be laminated to one or more layers of film, paper, foil, or other suitable materials to produce a composite that has improved insulating properties.

In the practice of this invention, there is formed a homogeneous flowable composition of a heat-plastified or molten normally solid thermoplastic polymer of one or more types of polysulfone and a volatile organic compound which is a chlorinated hydrocarbon, such as methylene chloride, under pressure and extruding the composition into a zone of sufficiently lower pressure to cause expansion of the extruded material with resultant formation of a cellular polymer body.

BRIEF DESCRIPTION OF THE DRAWING

For a better understanding of the present invention, reference should be made to the following description of a preferred embodiment of the invention to be read in conjunction with the attached drawing in which.

DETAILED DESCRIPTION AND EMBODIMENTS

Figure 1:
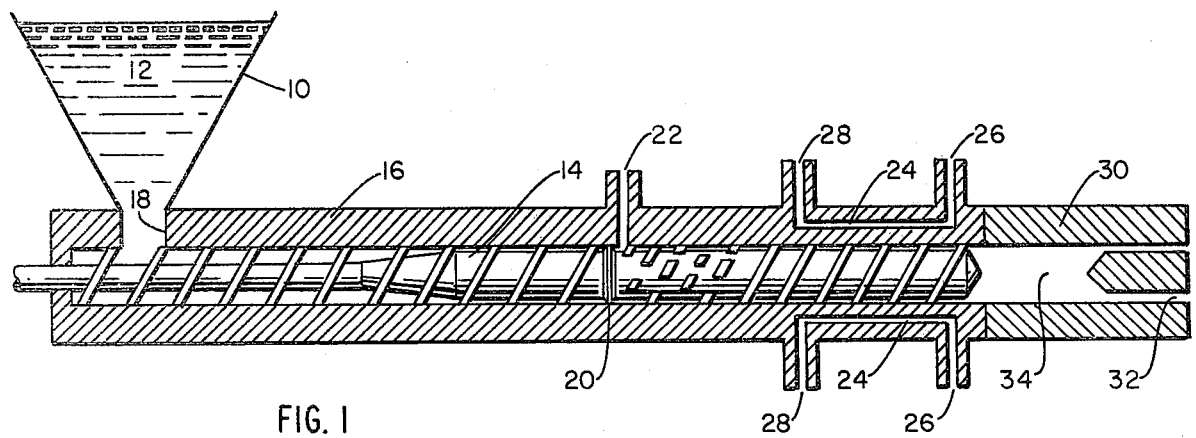
FIG. 1 is a schematic outline of a plastic extruder suitable for practicing the present invention.

There are normally gaseous elements, compounds or mixtures thereof that can be used as a blowing agent to produce cellular plastic products. Among the elemental gases that might be employed with satisfactory results are nitrogen, argon, neon, and helium. The lowest form densities that can be produced with these gases usually exceed 20.0 lb/cu ft.

In addition, normally gaseous organic compounds may be used to expand the plastic material. Among the most important of these are the halogen derivatives of methane and ethane, which are used as refrigerants and for similar purposes, such as chlorodifluoromethane, dichlorodifluoromethane, dichlorofluoromethane, difluorotetrachloroethane, dichlorotetrafluoroethane, difluorochloroethane, 1,1,-difluoroethane, ethyl chloride, methyl bromide, methyl chloride, trichlorofluoromethane, octofluorocyclobutane, monochloropentafluoroethane, and the like; mixtures of any two or more of the above. Many of these halogen derivatives, however, degrade at the normal extrusion temperatures of polysulfone polymers or have a low solubility in polysulfone polymers and, therefore, cannot be used to produce low density foam.

Other normally gaseous compounds that may be employed are acetylene, ammonia, butadiene, butane, butene, carbon dioxide, cyclopropane, dimethylamine, 2,2-dimethylpropane ethane, ethylamine, ethylene, isobutane, isobutylene, methane, monomethylamine, propane, propylene, and trimethylamine. These are not desirable blowing agents because they are either very flammable and/or have a very low solubility in polysulfone.

All of the aforementioned materials are intended to be embraced within the term "normally gaseous, expanding medium" as used herein. This term is intended to mean that the expanding medium employed is a gas at the temperatures existing under the normal operating conditions of a plastic extruder. Also, when reference is made to the introduction of a normally gaseous, expanding medium or a gas into a plastic compound in an extrusion cylinder, it is to be understood that, while the material introduced is a gas at the normal operating temperature of the extruder, it may be in either the gaseous or the liquid state at the temperature and pressure at which it is introduced into the extrusion cylinder. In fact, it is advantageous to employ blowing agents which are liquids when introduced into the extrusion cylinder because it is easier to pump a liquid under constant pressure and volume than it is to supply a gas under constant pressure and volume.

Examples of liquids which may be used as blowing agents include hydrocarbons, such as pentane, hexane, heptane, octane; unsaturated hydrocarbons, such as pentane, 4-methyl pentene, hexane; petroleum ester fractions; ethers such as dethyl ester; alcohols such as methanol or ethanol; ketones such as acetone or methyl ethyl ketone; and halogenated hydrocarbons such as carbon tetrachloride, chloroform, ethylene dichloride, methylene chloride, or 1,1,3-trichlor-1,2,2-trifluoroethane.

Methylene chloride has been found to be a particularly effective foaming agent for making cellular bodies from normally solid polysulfone polymers, which cellular bodies are composed of uniform small cells.

Methylene chloride is a solvent for polysulfone and plasticizes it. The plasticized polysulfone has a lower viscosity and the polysulfone can be processed at lower temperatures and higher rates. Depending on the amount of methylene chloride, the processing temperatures can be below 200° C. compared to the normal processing range of 285° to 371° C. At these lower processing temperatures the halogen derivatives of methane and ethane can be blended with methylene chloride to produce polysulfone foam.

The methylene chloride and any other blowing agent that is used in conjunction with it to foam the polysulfone that remains in the cells or dissolves in the cell walls after expansion, will eventually diffuse out into the atmosphere after a sufficient aging period. The aged cellular polysulfone will exhibit the same approximate heat distortion properties as the non-cellular polysulfone polymer. When used as a blowing agent, methylene chloride is usually incorporated in amounts from about 0.5 to about 55 percent by weight based on the polymer. Other ingredients such as fillers, antioxidants, anti-static agents, nucleation agents and the like may also be present in the polymer gel.

Other blowing agents that can be used but are not as effective at producing lower densities are the chemical blowing agents that decompose at the extrusion temperatures to liberate gases. The gases liberated by these blowing agents are usually nitrogen, carbon monoxide, carbon dioxide, and ammonia. Some chemical blowing agents will liberate all of the gases previously mentioned while others may only release one type of gas. Examples of chemical blowing agents include azodicarbonamide, p-Toluene sulfonyl semicarbazide, p,p-oxybis benzene sulfonyl hydrazide, p-Toluene sulfonyl hydrazide, dinitroso penta methylene, and the like. Again, these blowing agents are generally limited to producing product having densities greater than 20 lb/cu ft.

In practice, the cellular polysulfone polymer bodies of the invention are prepared by placing the molten polymer under pressure with the methylene chloride blowing agent such as by heating the materials in admixture with one another in a pressure-resistant vessel at temperatures between about 200°–371° C., suitably at a temperature at least as high as the melting point of the polymer, until a uniform or substantially uniform flowable gel is obtained. Thereafter, the gel is extruded into a zone of sufficiently lower pressure to cause the extruded material to expand with the resultant formation of a cellular polymer body. The process can be carried out batchwise or in a continuous manner.

The gel is preferably extruded at a temperature near or above the melting point of the polysulfone polymer, but higher or lower temperatures can be used. The temperature at which the gel is extruded into a zone of lower pressure will vary depending in part upon the size and arrangement of the apparatus employed, the rate of extrusion of the gel, the melting point of the polysulfone polymer and the proportions of the polymer and the methylene chloride employed.

In general, the addition of methylene chloride permits the gel to be extruded at a temperature below the temperature at which the polysulfone polymer is normally extruded.

In a preferred practice for making cellular polysulfone polymer body in a continuous manner, the normally solid polymer, e.g., polysulfone, suitably in granular form, is fed to a plastic extruder wherein it is heat-plastified and blended with the volatile methylene chloride blowing agent under pressure in the desired proportion to form a homogeneous flowably composition, which composition if brought to a substantially uniform temperature normally between 200° to 371° C. throughout its mass and is thereafter extruded and discharged through a suitable orifice into a zone of lower pressure, e.g., the atmosphere, wherein the extruded material expands to form a cellular body which is cooled and cut into pieces suitable for convenient handling.

The invention provides an improved and economical method for making cellular masses from polysulfone polymers, which cellular material is useful for a variety of purposes, e.g., as insulation, microwave oven food trays, and sound speakers. The products possess a highly uniform fine-cell structure consisting for the most part of thin-walled individuallly closed cells, and are flexible and tough.

Finely divided solid materials, such as calcium silicate, zinc stearate, magnesium stearate, and the like can advantageously be incorporated with the polymer or gel prior to expanding the same. Such finely divided materials aid in controlling the size of the cells and are employed in amounts of from 0.01 to 10 percent by weight of the polymer.

Figure 2:
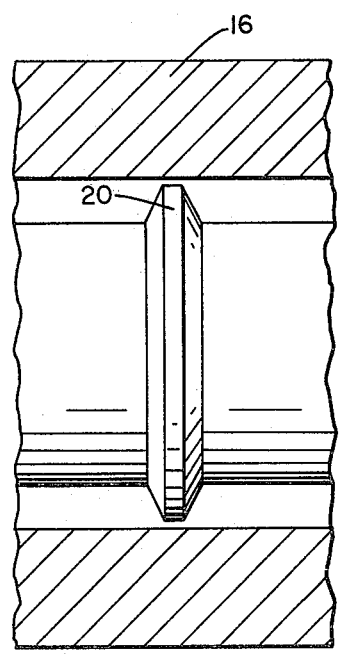
FIG. 2 is a fragmentary view enlarged to show detail of the sealing blister utilized in the apparatus of FIG. 1.

Turning to FIG. 1 of the drawing, there is shown a plastic extruder on which a hopper 10 is mounted. A polymer in suitable granular form 12 is fed from the hopper 10 into the extruder where it is pressed by a forwarding rotating screw 14 mounted for rotation in a barrel 16. At a point just to the right of the entrance 18 of the material from the hopper 10, a heating zone is provided, at which point the barrel is surrounded by conventional electric heaters with suitable temperature controls and intrumentation. After compression and melting, the molten polymer is forwarded around a sealing blister 20, the sealing blister forming a plastic seal against countercurrent flow of gas or vapors back through the barrel of the extruder and out the hopper. Detail on the sealing blister is shown in FIG. 2.

An inlet 22 is provided for the introduction of the blowing agent into the barrel. The blowing agent is fed under pressure through the inlet 22 to form an admixture with the molten polymer in the barrel. The admixture is mechanically agitated, thoroughly mixed, and brought to a uniform temperature throughout its mass. As a means of achieving the desired temperature control, the barrel is surrounded for a given length by passages 24 through which a heat transfer medium, such as steam, water, air, gas or oil may be circulated. The heat transfer medium passages have inlets 26 and outlets 28, as shown. Finally, the admixture in the form of a gel is fed into a die 30 and is extruded through the die orifice 32 into a zone of lower pressure, such as the atmosphere, where the gel expands to form a cellular body. The die orifice 32 may be detachably held in the die 30. An inlet passage 34 is in communication with the extruder, permitting entry of the foamable gel.

As the thermoplastic foam material is extruded through the annular orifice, it forms a tube that expands to about two to four times the diameter of the die orifice. After the tube is cooled, it may be slit and opened up into a flat sheet.

It is possible in the course of extruding products to vary the size and configuration of the die lips to produce products varying in cross-section along the axis of extrusion. The nature of the process and the design of the exit surface lips are such that an infinite variety of forms can be obtained.

The following examples illustrate ways in which the principle of the invention has been applied, but are not to be construed as limiting its scope.

EXAMPLE 1

As a specific example of materials suitable for the practice of the present invention, a polysulfone polymer having a melt flow at 650° F. (343.3° C.), 44 psi (0.30 M Pa), of 6.5 grams/10 minutes, a density of 1.24 Mg/m$^3$, and in common granular form may be fed into the hopper 10 of the extruder. Talc, as a foam nucleator, may also be fed to the hopper 10 at a concentration of approximately 0.5 pph of polysulfone. The blowing agent comprises methylene chloride fed to the inlet 22 at a concentration of approximately 20 parts per 100 parts of polysulfone. The temperature in the zone of the extruder just prior to the point of entry of the blowing agent may be maintained at about 232° C. The admixture of molten polymer and blowing agent from the zone just beyond the entry point of the blowing agent may then be cooled to a temperature of about 204° C. before passing through the die 30. The mass emerging from the die orifice 32 to atmospheric pressure expands and forms a cellular foam which is continuously shaped by the die orifice geometry as it emerges from the die orifice. The density of the foamed product is 2.5 lb/cu ft.

EXAMPLE 2

A second example of materials suitable for the practice of the present invention, a polysulfone polymer having a melt flow at 650° F. (343.3° C.), 44 psi (0.30 M Pa), 6.5 grams/10 minutes, a density of 1.24 Mg/m$^3$, and in the form of common granular, may be fed into the hopper 10 of the extruder. Talc, as a foam nucleator, may also be fed into the hopper at a concentration of approximately 1.0 pph of polysulfone. The blowing agent blend comprised of 66.6 parts methylene chloride and 33.3 parts of chlorodifluoromethane (Freon-22) are fed to the inlet 22 at a concentration of approximately 5.5 parts per 100 parts of polysulfone. The temperature in the zone of the extruder just prior to the point of entry of the blowing agent may be maintained at 246° C. The admixture of molten polymer and blowing agent from the zone just beyond the entry point of the blowing agent may then be cooled to a temperature of 218° C. before passing through the die 30. The mass emerging from the die orifice 32 to atmospheric pressure expands and forms a cellular foam which is continuously shaped by the die orifice geometry as it emerges from the die orifice. The density of the foamed product is 9 lb/cu ft.

What is claimed is:

1. In a process for producing a polysulfone foam, the steps of mixing a polysulfone polymer with a volatile organic blowing agent under sufficient heat and pressure to form a flowable gel and releasing said pressure to convert said flowable gel into a cellular mass, said blowing agent comprising methylene chloride.

2. In a process for producing a polysulfone polymer foam, the method which comprises the steps of mixing and kneading a polysulfone polymer with a volatile organic blowing agent under conditions of heating and pressure to form a flowable gel and, thereafter releasing the pressure by extruding out said gel, the improvement wherein said blowing agent comprises methylene chloride.

3. The process of claim 2, wherein said blowing agent comprises a mixture of methylene chloride and at least one other volatile organic blowing agent.

4. The process of claim 3, wherein said other blowing agent is a compound selected from the group consisting of halogen derivatives of methane or ethane, such as chlorodifluoromethane, dichlorodifluoromethane, dichlorofluoromethane, difluorotetrachloroethane, dichlorotetrafluoroethane, difluorochloroethane, 1,1-difluoroethane, ethyl chloride, methyl bromide, methyl chloride, trichlorofluoromethane, octofluorocyclobutane, monochloropentafluoroethane, trichloromonofluoromethane, trichlorotrifluoroethane, dichloromonofluoromethane, or mixtures of any two or more of said group of halogen derivatives.

5. The process of claim 3, wherein said other blowing agent is a compound selected from the group consisting of acetylene, ammonia, butadiene, butane, butene, cyclopropane, dimethylamine, carbon dioxide, 2,2,-dimethylamine, propane, propylene, or trimethylamine or mixtures of any two or more of said group.

6. The process of claim 3, wherein said other blowing agent is a compound selected from the group consisting of pentane, hexane, heptane, octane, or mixtures of any two or more of said group.

7. The process of claim 3, wherein said other blowing agent is a compound selected from the group of unsaturated hydrocarbons, such as pentene, 4-methyl pentane, hexane or mixtures of any two or more of said group.

8. The process of claim 3, wherein said other blowing agent is a compound of petroleum ester fractions such as dethyl ether.

9. The process of claim 3, wherein said other blowing agent is a compound selected from the group of alcohols such as methanol or ethanol or mixtures of two or more of said group of alcohols.

10. The process of claim 3, wherein said other blowing agent is a compound selected from the group of ketones, such as acetone, methyl ethyl ketone, or mixtures of two or more of said group of ketones.

11. The process of claim 3, wherein said other blowing agent is a compound selected from the group of halogenated hydrocarbons such as carbon tetrachloride, chloroform, ethylene dichloride, or 1,1,3-trichloro-1,2,2,-trifluoroethane, or mixtures of two or more of said group of halogenated hydrocarbons.

12. The process of claim 3, wherein said other blowing agent is a compound selected from the group of heat-decomposable chemical blowing agents, such as azodicarbonamide, p-Toluene sulfonyl semi carbazide, p,p-oxide benzene sulfonyl hydrazide, p-Toluene sulfonyl hydrazide, dinitroso penta methylene or mixtures of two or more of said group of heat-decomposable chemical blowing agents.

13. The process of claim 3, wherein said other blowing agent is mixed in an amount of 0.5–50 parts by weight per 100 parts per weight of said polysulfone polymer.

* * * * *